United States Patent
Schroedle et al.

(10) Patent No.: US 9,160,032 B2
(45) Date of Patent: Oct. 13, 2015

(54) ELECTROCHEMICAL CELLS AND USE THEREOF

(71) Applicants: Simon Schroedle, Ludwigshafen (DE); Jordan Keith Lampert, Ludwigshafen (DE); Martin Schulz-Dobrick, Mannheim (DE); Itamar Michael Malkowsky, Speyer (DE); Arnd Garsuch, Ludwigshafen (DE); Klaus Leitner, Ludwigshafen (DE); Olaf Kutzki, Mannheim (DE)

(72) Inventors: Simon Schroedle, Ludwigshafen (DE); Jordan Keith Lampert, Ludwigshafen (DE); Martin Schulz-Dobrick, Mannheim (DE); Itamar Michael Malkowsky, Speyer (DE); Arnd Garsuch, Ludwigshafen (DE); Klaus Leitner, Ludwigshafen (DE); Olaf Kutzki, Mannheim (DE)

(73) Assignee: BASF SE, Ludwigshafen (DE)

( * ) Notice: Subject to any disclaimer, the term of this patent is extended or adjusted under 35 U.S.C. 154(b) by 24 days.

(21) Appl. No.: 13/705,748

(22) Filed: Dec. 5, 2012

(65) Prior Publication Data

US 2013/0209896 A1 Aug. 15, 2013

Related U.S. Application Data

(60) Provisional application No. 61/568,178, filed on Dec. 8, 2011, provisional application No. 61/568,186, filed on Dec. 8, 2011.

(51) Int. Cl.
| | |
|---|---|
| *H01M 10/052* | (2010.01) |
| *H01M 10/056* | (2010.01) |
| *H01M 4/50* | (2010.01) |
| *H01M 10/058* | (2010.01) |

(Continued)

(52) U.S. Cl.
CPC ............ *H01M 10/056* (2013.01); *H01M 4/502* (2013.01); *H01M 4/505* (2013.01); *H01M 10/058* (2013.01); *H01M 10/0525* (2013.01); *H01M 10/0567* (2013.01); *H01M 4/131* (2013.01); *H01M 4/133* (2013.01); *H01M 2300/0037* (2013.01); *Y02E 60/122* (2013.01); *Y10T 29/49108* (2013.01)

(58) Field of Classification Search
CPC .................... H01M 10/0567; H01M 10/0569; H01M 10/0565; H01M 4/131
USPC ........................................................ 429/338
See application file for complete search history.

(56) References Cited

U.S. PATENT DOCUMENTS

| | | | |
|---|---|---|---|
| 6,235,431 B1 * | 5/2001 | Takechi et al. ................ | 429/302 |
| 2008/0213488 A1 * | 9/2008 | Stanjek et al. ............. | 427/385.5 |

FOREIGN PATENT DOCUMENTS

WO WO 2007/049888 A1 5/2007

OTHER PUBLICATIONS

Aurbach et al. (Journal of Power Sources 162 (2006) 780-789).*

(Continued)

*Primary Examiner* — Stewart Fraser
*Assistant Examiner* — Olatunji Godo
(74) *Attorney, Agent, or Firm* — Oblon, McClelland, Maier & Neustadt, L.L.P.

(57) ABSTRACT

Electrochemical cells comprise
- (A) at least one cathode comprising at least one lithiated Mn-containing compound having an Mn content of from 60 to 80 mol %, based on transition metal in cathode (A),
- (B) at least one anode comprising carbon in electrically conductive form,
- (C) at least one electrolyte comprising
  - (a) at least one aprotic organic solvent,
  - (b) at least one lithium salt, and
  - (c) at least one organic compound having at least one Si—N single bond per molecule.

14 Claims, 2 Drawing Sheets capacity vs cycle number for EZ.1 (curve b) and V-EZ.2 (curve a)

(51) Int. Cl.
- *H01M 4/505* (2010.01)
- *H01M 10/0525* (2010.01)
- *H01M 10/0567* (2010.01)
- *H01M 4/131* (2010.01)
- *H01M 4/133* (2010.01)

(56) References Cited

OTHER PUBLICATIONS

U.S. Appl. No. 13/705,709, filed Dec. 5, 2012, Schroedle, et al.

International Search Report issued Apr. 26, 2013, in International Patent Application No. PCT/EP2012/073457 (with English translation of Category of Cited Documents).

Sheng Shui Zhang, "A review on electrolyte additives for lithium-ion batteries", Journal of Power Sources 162, Elsevier, XP027938606, Nov. 22, 2006, pp. 1379-1394.

Doron Aurbach, et al., "Studies of cycling behavior, ageing, and interfacial reactions of $LiNi_{0.5}Mn_{1.5}O_4$ and carbon electrodes for lithium-ion 5-V cells", Journal of Power Sources 162, Elsevier, XP027938520, Nov. 22, 2006, pp. 780-789.

\* cited by examiner

Figure 1: schematic construction of a disassembled electrochemical cell for testing inventive mixtures
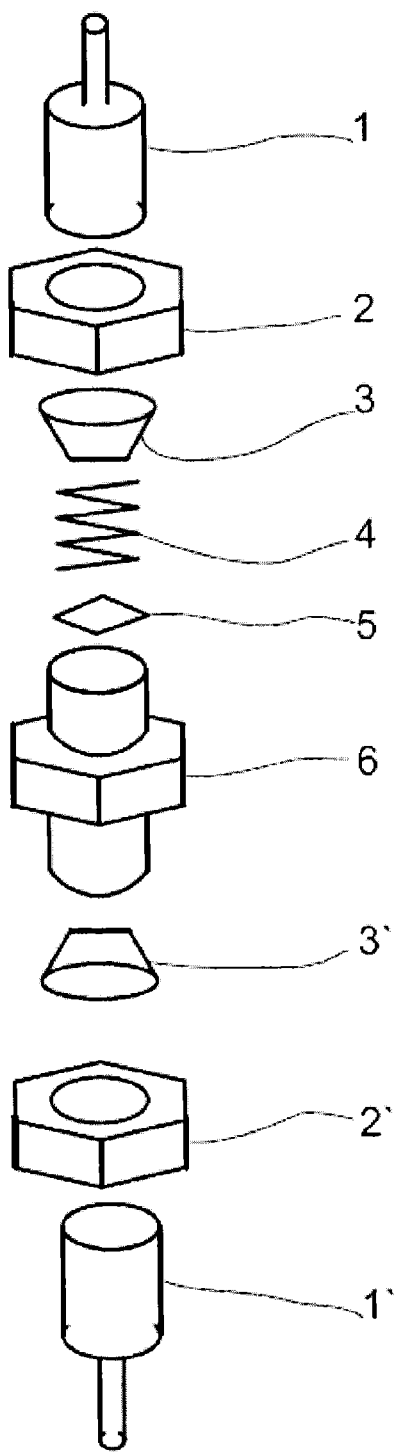

Figure 2: capacity vs cycle number for EZ.1 (curve b) and V-EZ.2 (curve a)
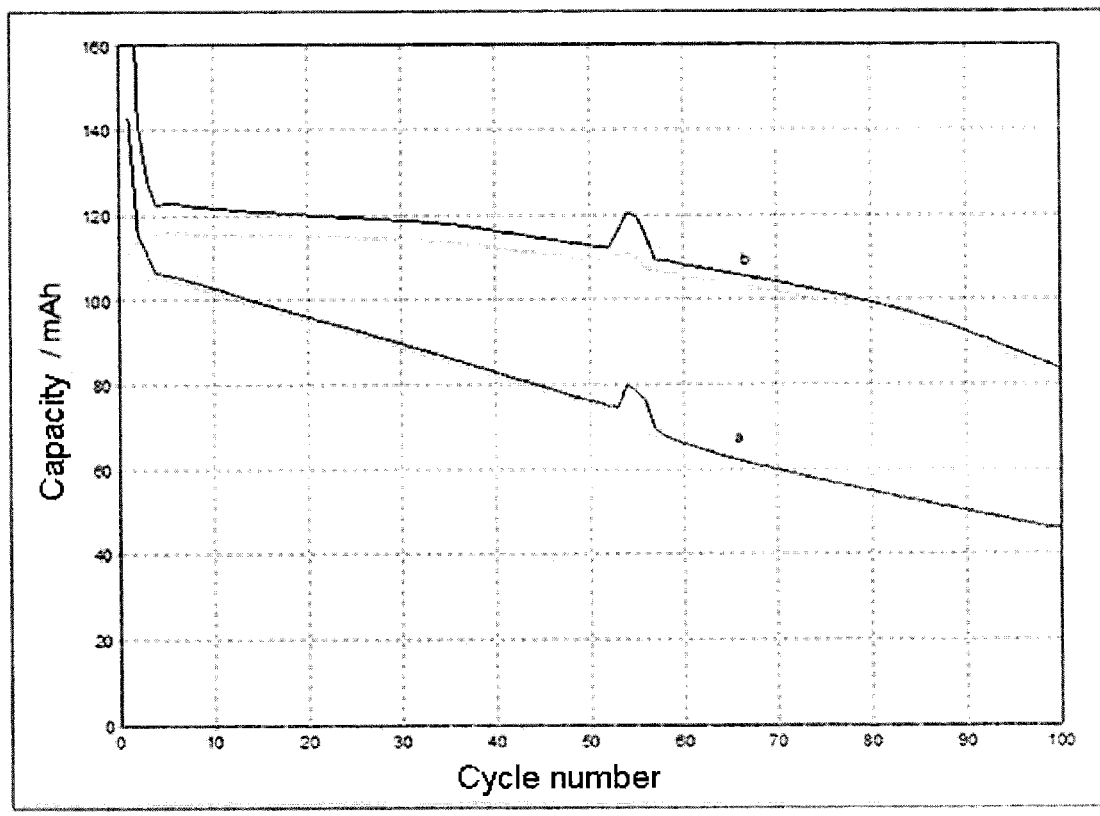

ELECTROCHEMICAL CELLS AND USE THEREOF

BRIEF DESCRIPTION OF THE DRAWINGS

FIG. 1 shows a schematic construction of a disassembled electrochemical cell for testing inventive mixtures.

FIG. 2 shows a capacity vs cycle number for EZ.1 (curve b) and V-EZ.2 (curve a).

The present invention relates to electrochemical cells comprising
- (A) at least one cathode comprising at least one lithiated Mn-containing compound having an Mn content of from 60 to 80 mol %, based on transition metal in cathode (A),
- (B) at least one anode comprising carbon in electrically conductive form,
- (C) at least one electrolyte comprising
  - (a) at least one aprotic organic solvent,
  - (b) at least one lithium salt, and
  - (c) at least one organic compound having at least one Si—N single bond per molecule.

The search for ways to store electric energy efficiently has been going on for years. Efficient storage of electric energy would allow electric energy to be generated when it is advantageous and used when needed.

Accumulators, for example lead accumulators and nickel-cadmium accumulators, have been known for many decades. The known lead accumulators and nickel-cadmium accumulators have the disadvantages, however, of a comparatively low energy density and of a memory effect which reduces the rechargeability and hence the useful life of lead accumulators and nickel-cadmium accumulators.

Lithium ion accumulators, frequently also referred to as lithium ion batteries, are used as an alternative. They provide higher energy densities than accumulators based on lead or comparatively noble heavy metals.

Since many lithium ion batteries utilize metallic lithium or lithium in oxidation state 0, or produce it as an intermediate, they are water sensitive. Moreover, the electrolytes used, for example $LiFP_6$, are water sensitive during long-term operation. Water is therefore out of the question as a solvent for the lithium salts used in lithium ion batteries. Instead, organic carbonates, ethers and esters are used as sufficiently polar solvents. The literature accordingly recommends using water-free solvents for the electrolytes, see for example WO 2007/049888.

Water-free solvents, however, are inconvenient to produce and process. Numerous solvents inherently useful for lithium ion batteries comprise in the order of 100 ppm or more of water. However, such high proportions of water are unacceptable for most lithium ion batteries. The problem of providing sufficiently suitable solvents for lithium ion batteries is complicated by the fact that most state of the art lithium ion batteries comprise not a single solvent but solvent mixtures of which some differ greatly in their activity with driers.

U.S. Pat. No. 6,235,431 proposes adding compounds having Si—N bonds as an additive to the solvent (mix) in a lithium ion battery. This compound reacts with water and thereby protects not only the conducting salt but also the cathode material. U.S. Pat. No. 6,235,431 specifically recommends organosilazanes and organodisilazanes as well as hexamethylcyclotrisilazane. It was observed, however, that compounds of this type can react with water to form ammonia or volatile organic amines which are capable of damaging a lithium ion battery in prolonged operation thereof.

Electrochemical cells are known where the cathode material comprises manganese-rich materials wherein the lithium deintercalation takes place essentially at high potentials. High voltages for the purposes of this invention are voltages above 4.5 volts, based on the potential of metallic lithium. Particularly high energy densities are obtained when cathode materials of this type are used in conjunction with carbon anodes. Useful carbon anodes include for example anodes comprising graphite, partially or fully amorphous particles of carbon. Known electrochemical cells based on these materials have aging properties that are insufficient for many possible areas of use, especially in the motor vehicle sector. For instance, a severe decrease in capacity is observed on repeatedly charging and discharging cells of this type, see for example D. Aurbach et al., J. Power Sci. 2006, 162, 780.

The present invention has for its object to provide electrochemical cells that have good performance characteristics and, more particularly, are readily cyclable without displaying adverse signs of aging.

We have found that this object is achieved by the electrochemical cells defined at the beginning.

For the purposes of the present invention, lithium ion accumulators are also referred to as lithium ion batteries.

Electrochemical cells of the present invention comprise
- (A) at least one cathode, also called cathode (A) for short, comprising at least one lithiated Mn-containing compound having an Mn content of at least 60 to 80 mol %, based on transition metal in cathode (A),
- (B) at least one anode, also called anode (B) for short, comprising carbon in electrically conductive form,
- (C) at least one electrolyte comprising
  - (a) at least one aprotic organic solvent, also called solvent (a) for short,
  - (b) at least one lithium salt, also called lithium salt (b) for short,
  - (c) at least one organic compound having at least one Si—N single bond per molecule, also called compound (c) for short.

Cathode (A), anode (B) and electrolyte (C) will now be more particularly described.

The lithium-containing compound present in cathode (A) is selected from lithium-containing transition metal mixed oxides of layered structure, lithiated transition metal mixed oxides of spinel structure and lithiated transition metal phosphates of olivine structure, for example $LiMn_{1-h}Fe_hPO_4$ (where $0.2 \le h \le 0.4$). Suitable transition metal mixed oxides of layered structure are especially those of the general formula

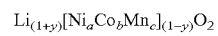
$Li_{(1+y)}[Ni_aCo_bMn_c]_{(1-y)}O_2$ where y is selected from zero to 0.3 and preferably from 0.05 to 0.2,
c is from 0.6 to 0.8, a and b may each be the same or different and are in the range from 0.0 to 0.4, subject to the proviso:

$a+b+c=1$

Suitable transition metal mixed oxides of spinel structure are especially those of the general formula (I)

$Li_{1+t}M_{2-t}O_{4-d}$     (I)

where
d is from zero to 0.4,
t is from zero to 0.4,
while from 60 to 80 mol % of M is manganese. Further M's, from which not more than 40 mol % is chosen, are one or more metals from groups 3 to 12 of the periodic table, for example Ti, V, Cr, Fe, Co, Ni, Zn, Mo, with preference being given to Co and Ni, and especially Ni.

In this connection, the phrase "transition metal in cathode (A)" is to be understood as meaning the entire transition metal comprised in the cathode material irrespective of the oxidation state, but not current collectors which may comprise transition metal.

In one embodiment of the present invention, at least one cathode (A) comprises a cathodic active material having a manganese content ranging from 60 to 80 mol % and preferably from 73 to 78 mol %, based on transition metal in cathode (A).

In one embodiment of the present invention, lithiated Mn-containing compound is selected from $LiNi_{0.25}Mn_{0.75}O_4$, $LiNi_{0.24}Mn_{0.76}O_4$ and $LiNi_{0.26}Mn_{0.74}O_4$.

Cathode (A) may further comprise for example carbon in electrically conductive form, for example as carbon black, graphite, graphene or as carbon nanotubes.

Cathode (A) may further comprise for example a binder, for example a polymeric binder. Particularly suitable polymeric binders are polyvinylidene fluoride (PVdF), polytetrafluoroethylene, copolymers of tetrafluoroethylene and hexafluoropropylene, copolymers of tetrafluoroethylene and vinylidene fluoride and polyacrylonitrile.

Electrochemical cell of the present invention comprises at least one anode (B).

In one embodiment of the present invention, at least one anode (B) comprises carbon in an electrically conductive form, for example carbon black, what is known as hard carbon, i.e., graphite-like carbon with larger amorphous regions than graphite has, or preferably graphite.

Electrochemical cell of the present invention comprises at least one electrolyte (C) comprising
(a) at least one aprotic organic solvent,
(b) at least one lithium salt, and
(c) at least one organic compound having at least one Si—N single bond per molecule.

Electrolyte (C) is liquid under standard conditions (1 bar, 0° C.) and preferably also at 1 bar and −15° C.

Electrolyte (C) comprises at least one aprotic solvent (a), preferably at least two aprotic solvents (a) and more preferably at least three aprotic solvents (a). Aprotic solvent (a) is generally an organic solvent.

In one embodiment of the present invention, electrolyte (C) may comprise up to ten different aprotic solvents (a).

For the purposes of the present invention, aprotic organic solvents (a) are not just those aprotic solvents that are liquid at room temperature.

The present invention also comprises aprotic organic compounds which are solid at room temperature as pure compound, but which are liquid in admixture with the remaining aprotic organic solvents. Ethylene carbonate may be mentioned by way of example in that it is liquid within wide limits when in a mixture with diethyl carbonate and/or methyl ethyl carbonate, but as a pure substance has a melting point of about 36° C.

In one embodiment of the present invention, aprotic organic solvent (a) is selected from
(i) cyclic and noncyclic organic carbonates,
(ii) di-$C_1$-$C_{10}$-alkyl ethers,
(iii) di-$C_1$-$C_4$-alkyl-$C_2$-$C_6$-alkylene ethers,
(iv) cyclic ethers,
(v) cyclic and acyclic acetals and ketals,
(vi) orthocarboxylic esters, and
(vii) cyclic and noncyclic carboxylic esters.

In one preferred embodiment of the present invention, aprotic organic solvent (a) is selected from
(i) organic carbonates, cyclic or acyclic,
(ii) di-$C_1$-$C_{10}$-alkyl ethers,
(iii) di-$C_1$-$C_4$-alkyl-$C_2$-$C_6$-alkylene ethers, and
(v) cyclic and acyclic acetals and ketals.

Examples of preferred noncyclic organic carbonates (i) are di-$C_1$-$C_4$-alkyl carbonates where $C_1$-$C_4$-alkyl may be the same or different and is selected from $C_1$-$C_4$-alkyl, for example methyl, ethyl, n-propyl, isopropyl, n-butyl, isobutyl, sec-butyl, preferably methyl or ethyl.

Particularly preferred noncyclic organic carbonates (i) are dimethyl carbonate, diethyl carbonate and methyl ethyl carbonate and mixtures thereof, i.e., mixtures of at least two of the recited compounds dimethyl carbonate, diethyl carbonate and methyl ethyl carbonate.

Examples of preferred cyclic organic carbonates (i) are those of the general formula (V a) and (V b)

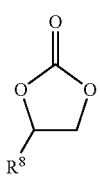

(Va)

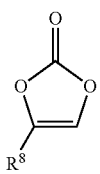

(Vb)

where $R^8$ is selected $C_1$-$C_4$-alkyl, for example methyl, ethyl, n-propyl, isopropyl, n-butyl, isobutyl, sec-butyl, preferably methyl,
fluorine, mono- or polyfluorinated $C_1$-$C_4$-alkyl, for example $CF_3$ or n-$C_4H_9$, and especially hydrogen.

Preferred cyclic organic carbonate (i) is further difluoroethylene carbonate,

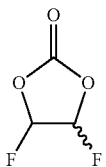

Examples of preferred di-$C_1$-$C_{10}$-alkyl ethers (ii) are diethyl ether, diisopropyl ether and di-n-butyl ether.

Examples of di-$C_1$-$C_4$-alkyl-$C_2$-$C_6$-alkylene ethers (iii) are 1,2-dimethoxyethane, 1,2-diethoxyethane, diethylene glycol dimethyl ether, triethylene glycol dimethyl ether, tetraethylene glycol dimethyl ether and diethylene glycol diethyl ether.

Examples of cyclic ethers (iv) are 1,4-dioxane and tetrahydrofuran (THF).

Examples of acyclic acetals and ketals (v) are 1,1-dimethoxyethane and 1,1-diethoxyethane.

Examples of cyclic acetals and ketals (v) are 1,3-dioxolane and 1,3-dioxane.

Examples of orthocarboxylic esters (vi) are tri-$C_1$-$C_4$-alkyl orthoformates, especially trimethyl orthoformate and triethyl orthoformate.

Examples of carboxylic esters (vii) are ethyl acetate and methyl butyrate and also dicarboxylic esters, for example dimethyl malonate. γ-Butyrolactone is an example of a cyclic carboxylic ester (lactone).

In one specific embodiment of the present invention, mixture according to the present invention comprises noncyclic organic carbonate(s) and cyclic organic carbonate(s) in a weight ratio of 1:10 to 10:1 and preferably 3:1 to 1:1.

Electrolyte (C) further comprises at least one lithium salt (b). Lithium salts (b) are preferably salts of monovalent anions. Examples of suitable lithium salts (b) are $LiPF_6$, $LiBF_4$, $LiClO_4$, $LiAsF_6$, $LiCF_3SO_3$, $LiC(C_xF_{2x+1}SO_2)_3$, lithium bisoxalatoborate, lithium difluorobisoxalatoborate, lithium imides such as $LiN(C_xF_{2x+1}SO_2)_2$, where x is an integer from 1 to 20, $LiN(SO_2F)_2$, $Li_2SiF_6$, $LiSbF_6$, $LiAlCl_4$, and salts of the general formula $(C_xF_{2x+1}SO_2)_mXLi$, where x is as defined above and m is as defined below:
m=1, when X is selected from oxygen and sulfur,
m=2, when X is selected from nitrogen and phosphorus, and
m=3, when X is selected from carbon and silicon.

Particularly preferred lithium salts (b) are selected from $LiPF_6$, $LiBF_4$, $LiSbF_6$, LiBOB, LDFOB and $LiPF_3(CF_2CF_3)_3$ (LiFAP).

Electrolyte (C) further comprises (c) at least one organic compound having at least one Si—N single bond per molecule, called compound (c) for short. Compound (c) may be cyclic or acyclic.

Examples of acyclic compounds (c) are those of the general formula (VI) and (VII)

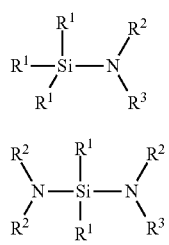

where the variables are defined as follows:
$R^1$ in each occurrence is different or preferably the same and selected from
- $C_1$-$C_{10}$-alkyl, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, n-nonyl, n-decyl; more preferably $C_1$-$C_4$-alkyl such as methyl, ethyl, n-propyl, isopropyl, n-butyl, isobutyl, sec-butyl and tert-butyl and even more preferably methyl,
- $C_1$-$C_{10}$-alkoxy, preferably $C_1$-$C_4$-n-alkoxy, for example ethoxy, n-propoxy, n-butoxy and especially methoxy,
- $C_3$-$C_{10}$-cycloalkyl, for example cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl,
- benzyl and
- $C_6$-$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl and more preferably phenyl,
- each unsubstituted or substituted one or more times with $C_1$-$C_4$-alkyl, especially methyl or isopropyl, or with benzyl or phenyl,
- examples of substituted phenyl being for example para-methylphenyl, 2,6-dimethylphenyl and para-biphenyl.

$R^2$ is selected from $COOR^7$, for example $COOCH_3$, $COOC_2H_5$,
- $C_1$-$C_{10}$-alkyl, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, n-nonyl, n-decyl; more preferably $C_1$-$C_4$-alkyl such as methyl, ethyl, n-propyl, isopropyl, n-butyl, isobutyl, sec-butyl and tert-butyl and even more preferably methyl, ethyl or isopropyl,
- $C_2$-$C_{10}$-alkenyl, especially vinyl, 1-allyl, 2-allyl and homoallyl,
- $C_3$-$C_{10}$-cycloalkyl, for example cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl,
- benzyl,
- $C_6$-$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl and more preferably phenyl,
- each unsubstituted or substituted one or more times with $C_1$-$C_4$-alkyl, especially methyl or isopropyl, or with benzyl or phenyl, $R^3$ is selected from
- $C_1$-$C_{10}$-alkyl, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, n-nonyl, n-decyl; more preferably $C_1$-$C_4$-alkyl such as methyl, ethyl, n-propyl, isopropyl, n-butyl, isobutyl, sec-butyl and tert-butyl and even more preferably methyl,
- $C_3$-$C_{10}$-cycloalkyl, for example cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl,
- benzyl,
- $C_6$-$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl and more preferably phenyl,
- each unsubstituted or substituted one or more times with $C_1$-$C_4$-alkyl, especially methyl or isopropyl, or with benzyl or phenyl,
- and especially hydrogen.

Preference is given to cyclic compounds, for example of the general formula (VII),

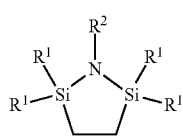

and especially of the general formulae (III) or (IV)

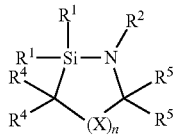
(III)

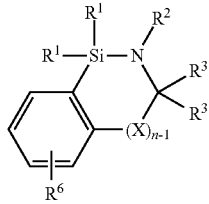
(IV)

where $R^1$ and $R^2$ are each as defined above. The remaining variables are defined as follows:

$R^3$ and $R^4$ are each different or preferably the same and selected from

- $C_1$-$C_{10}$-alkyl, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, n-nonyl, n-decyl; more preferably $C_1$-$C_4$-alkyl such as methyl, ethyl, n-propyl, isopropyl, n-butyl, isobutyl, sec-butyl and tert-butyl and even more preferably methyl,
- $C_3$-$C_{10}$-cycloalkyl, for example cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl,
- benzyl,
- $C_6$-$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl and more preferably phenyl,
  each unsubstituted or substituted one or more times with $C_1$-$C_4$-alkyl, especially methyl or isopropyl, or with benzyl or phenyl,
  and especially hydrogen, or $>C(R^3)_2$ is a $>C=O$ group.

Examples of preferred $>C(R^3)_2$ are further $CHC_6H_5$, $CH(CH_3)$, $C(CH_3)_2$ and especially $CH_2$.

Preferably, $R^3$ and $R^4$ are each pairwise the same and selected from hydrogen and methyl.

X in each occurrence is different or the same and selected from oxygen, sulfur, N—$R^5$ and $C(R^6)_2$, where $R^5$ is selected from

- $C_1$-$C_{10}$-alkyl, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, n-nonyl, n-decyl; more preferably $C_1$-$C_4$-alkyl such as methyl, ethyl, n-propyl, isopropyl, n-butyl, isobutyl, sec-butyl and tert-butyl and even more preferably methyl,
- $C_3$-$C_{10}$-cycloalkyl, for example cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl,
- benzyl and
- $C_6$-$C_{14}$-aryl, each unsubstituted or substituted one or more times with $C_1$-$C_4$-alkyl, especially methyl or isopropyl, or with benzyl or phenyl, $R^6$ in each occurrence is the same or preferably different and selected from

- hydrogen and
- $C_1$-$C_{10}$-alkyl, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, n-nonyl, n-decyl; more preferably $C_1$-$C_4$-alkyl such as methyl, ethyl, n-propyl, isopropyl, n-butyl, isobutyl, sec-butyl and tert-butyl and even more preferably methyl,
- $C_3$-$C_{10}$-cycloalkyl, for example cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl,
- benzyl and
- $C_6$-$C_{14}$-aryl, each unsubstituted or substituted one or more times with $C_1$-$C_4$-alkyl, especially methyl or isopropyl, or with benzyl or phenyl,
  each unsubstituted or substituted one or more times with $C_1$-$C_4$-alkyl, benzyl or phenyl, $R^7$ is selected from $C_1$-$C_4$-alkyl, such as methyl, ethyl, n-propyl, isopropyl, n-butyl, isobutyl, sec-butyl and tert-butyl and very particularly preferably methyl, ethyl and isopropyl, n is an integer from 1 to 3, preferably 1 or 2 and especially 1.

It is particularly preferable for X to be selected from $CHCH_3$ and $CH(CH_2CH_3)$.

When, in compounds of formula (II), n=1, then the formula corresponds to the general formula (II')

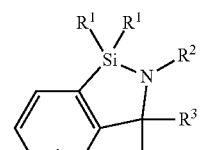
(II')
(II) where n = 1 and there is no actual group X.

In one preferred embodiment of the present invention, compound (c) is selected from compounds of the general formulae (I a), (I b), (II a) and (II b),

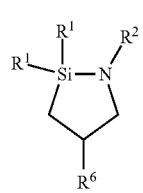
(I a)

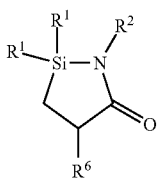
(I b)

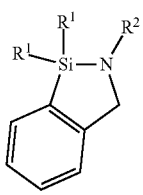
(II a)

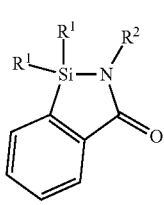
(II b)

R¹ in each occurrence is different or the same and selected from

C$_1$-C$_4$-alkyl, such as methyl, ethyl, n-propyl, isopropyl, n-butyl, isobutyl, sec-butyl and tert-butyl, very particularly preferably methyl, C$_1$-C$_4$-alkoxy, such as ethoxy, n-propoxy, isopropoxy, n-butoxy and especially methoxy, and phenyl, R² is selected from C$_1$-C$_4$-alkyl, such as methyl, ethyl, n-propyl, isopropyl, n-butyl, isobutyl, sec-butyl and tert-butyl, very particularly preferably methyl and tert-butyl,

COOCH$_3$, COOC$_2$H$_5$,

C$_2$-C$_3$-alkenyl, for example —CH═CH$_2$, —CH$_2$—CH═CH$_2$, (E)-CH═CH—CH$_3$ and (Z)-—CH═CH—CH$_3$, and phenyl, R⁶ in each occurrence is the same or preferably different and selected from hydrogen and methyl.

In one preferred embodiment of the present invention, compound (c) is selected from the following compounds:

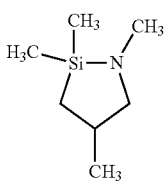
(I a.1)

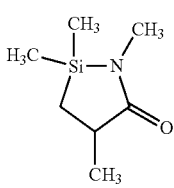
(I b.1)

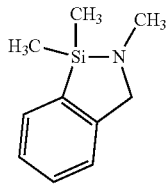
(II a.1)

(II b.1)

(CH$_3$)$_3$Si—N(CH$_3$)$_2$, (CH$_3$)$_3$Si—N(C$_2$H$_5$)$_2$, (CH$_3$)$_3$Si—NHC(CH$_3$)$_3$, (CH$_3$)$_3$Si—NH(CH$_2$C$_6$H$_5$), and (CH$_3$)$_3$Si—N(iso-C$_3$H$_7$)$_2$.

Electrolyte (C) may further comprise
from zero to 30 ppm of water, preferably from 3 to 25 ppm and more preferably at least 5 ppm. Here ppm is always weight ppm (parts per million), based on total electrolyte.

The proportions of water can be determined by various methods known per se. Karl Fischer titration to DIN 51777 or ISO760: 1978 for example is particularly suitable. By "zero ppm of water" is meant that the water amounts are below the detection limit.

Electrolyte (C) may further comprise at least one additive, also called additive (d) for short. Additives (d) may be for example: aromatic compounds, sultones, cyclic exo-methylene carbonates, lithium bisoxalatoborate (LiBOB) and lithium (difluorooxalato)borate (LiDFOB).

Examples of aromatic compounds suitable as additive (d) are biphenyl, cyclohexylbenzene and 1,4-dimethoxybenzene.

Sultones may be substituted or unsubstituted. Examples of suitable sultones are butanesultone and propylenesultone (propanesultone), formula (IX),

(IX)

and particularly sultones having at least one C—C double bond per molecule. An example of a substituted sultone is 1-phenyl-1,3-butanesultone.

Examples of exo-methylene ethylene carbonates useful as additive (d) are particularly compounds of general formula (X)

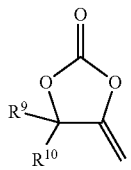
(X)

where in each case $R^9$ and $R^{10}$ can be different or the same and are selected from $C_1$-$C_{10}$-alkyl and hydrogen. In one preferred embodiment, $R^9$ and $R^{10}$ are both methyl. In another preferred embodiment of the present invention, $R^9$ and $R^{10}$ are both hydrogen.

Additives (d) may further be cyclic or acyclic alkanes which preferably have a boiling point of at least 36° C. as pure substances and at a pressure of 1 bar. Examples are cyclohexane, cycloheptane and cyclododecane. It is further possible to use organic esters of inorganic acids, for example methyl ester or ethyl ester of phosphoric acid or sulfuric acid.

In one embodiment of the present invention, electrolyte (C) contains no further components beyond aprotic organic solvent (a), lithium salt (b), compound (c), water and optional additive (d).

In one embodiment of the present invention, electrolyte (C) has the following composition:
  (a) altogether from 50 to 99.5 wt %, preferably from 60 to 95 wt % and more preferably from 70 to 90 wt % of aprotic organic solvent (a),
  (b) from 0.1 to 25 wt % and preferably from 5 to 18 wt % of lithium salt (b),
  (c) from 0.01 to 5 wt %, preferably 0.08 to 3 wt % and more preferably 0.15 to 2 wt % of compound (c),
  (d) altogether zero to altogether 10 wt %, preferably 0.01 to 5 wt % and more preferably 0.4 to 2 wt % of additive(s) (d), and
  (e) zero to 50 ppm, preferably 3 to 25 ppm and more preferably at least 5 ppm of water,
wherein recitations in wt % and ppm are each based on total electrolyte (C).

Lithium ion batteries according to the present invention may further comprise customary constituents, for example one or more separators, one or more current collector platelets and a housing.

Electrolytes (C) used according to the present invention are obtainable for example as follows:
(α) providing at least one aprotic organic solvent (a), called step (α) for short,
(β) optionally mixing with at least one further aprotic organic solvent (a), also called step (β) for short, to obtain a mixture that is liquid at standard conditions,
(γ) optionally mixing with one or more additives (d), called step (γ) for short,
(δ) drying, called step (δ) for short, and
(ε) mixing with compound (c) and optionally with at least one additive (d) and optionally with at least one lithium salt (b), called step (ε) for short.

Steps (α) to (ε) may be carried out in the aforementioned order or in some other order. It is possible for instance to adhere essentially to the aforementioned order of steps (α) to (ε), but to perform step (δ) immediately before step (γ).

Another version comprises adhering essentially to the aforementioned order of steps (α) to (ε), but to perform step (γ) directly before step (β).

Solvent (a), additives (d), compound (c) and lithium salts (b) are defined above.

Steps (α) to (ε) will now be more particularly described.

Mixing solvent (a), compound (c), lithium salt (b) and optionally additive (d) can be done at any desired temperature.

Step (α):

One or more solvents (a) are provided. Individual solvents (a) or all solvents (a) may be provided in the dried state, for example with a water content of 1 to 50 ppm, or with a higher water content.

Steps (β), (γ) and (ε): Mixing Steps

One embodiment of the present invention comprises mixing in each case at temperatures ranging from 10 to 100° C. and more preferably at room temperature.

One embodiment of the present invention comprises mixing at a temperature of at least 1° C. above the melting point of the highest-melting solvent (a).

The upper temperature limit for mixing is determined by the volatility of the most volatile solvent (a). Preference is given to mixing at a temperature below the boiling point of the most volatile solvent (a).

Mixing can be done at any desired pressure, and atmospheric pressure is preferred. The duration of mixing can be chosen for example in the range from 5 minutes up to 24 hours.

Step (β) comprises choosing the quantitative ratios of solvent(s) (a) such that a mixture that is liquid at room temperature is obtained. Preference is given to choosing the quantitative ratios of solvent(s) (a) such that a mixture that is liquid at 0° C. is obtained. Particular preference is given to choosing the quantitative ratios of solvent(s) (a) such that a mixture that is liquid at −15° C. is obtained. Examination as to whether the mixture from step (β) is liquid can be effected for example through simple optical inspection, for example through visual inspection.

The melting point of a mixture can be lowered by adding diethyl carbonate or methyl ethyl carbonate for example.

Mixing preferably takes place under anhydrous conditions, i.e., under exclusion of air and especially under exclusion of moisture, for example under dry air. Mixing preferably takes place under air exclusion (inert conditions), for example under dry nitrogen or dry noble gas.

Step (δ):

Step (δ) comprises drying. Drying can take place after or preferably before addition of compound of general formula (I) or (II), optionally of additive(s) (d) and optionally of lithium salt(s) (b).

Drying can be effected in a conventional manner over a drier, preferably over molecular sieves. Molecular sieves are preferably chosen from natural and synthetic zeolites which can be in the form of spheres (beads), powders or rods. Preference is given to using 4 Å molecular sieve and more preferably 3 Å molecular sieve.

The actual drying can be effected for example by stirring above the drier(s).

Preference is given to letting molecular sieve act on solvent (a) in the absence of chemical driers. Chemical driers for the purposes of the present invention are strongly acidic, alkaline or strongly reducing driers, more particularly selected from low molecular weight compounds, salts and elements. Known acidic driers include for example aluminum alkyls such as for example trimethylaluminum, also phosphorus pentoxide and concentrated sulfuric acid. Known basic driers include for example potassium carbonate and $CaH_2$. Known reducing driers include for example elemental sodium, elemental potassium and sodium-potassium alloy.

One embodiment of the present invention comprises conducting step (δ) at a temperature in the range from 15 to 40° C. and preferably in the range from 20 to 30° C.

In one embodiment of the present invention, the time for which molecular sieve is allowed to act in step (δ) is in the range from a few minutes, for example at least 5 minutes, to several days, preferably not more than 24 hours and more preferably in the range from 1 to 6 hours.

During the practice of step (δ) a little solvent mixture can be removed one or more times in order that the progress of drying may be tracked by means of Karl Fischer titration.

It is preferable to keep the stirring or shaking to a minimum. Excessively vigorous stirring/shaking can lead to partial disintegration of the molecular sieve, and this may give rise to problems with removal by filtration.

This is followed by removing the drier(s), for example by distilling the solvent(s) (a) off and especially by decanting or filtration.

The present invention further provides for the use of electrochemical cells of the present invention in lithium ion batteries. More particularly, electrochemical cells of the present invention are useful in lithium ion batteries wherein a potential difference of at least 4.5 volts is reached between at least one anode and at least one cathode at least temporarily during the production and/or use of the electrochemical cell in question.

In one embodiment of the present invention, electrochemical cells of the present invention are used for driving motor vehicles alone or combined with an internal combustion engine.

In another embodiment of the present invention, electrochemical cells of the present invention are used for energy storage in electrical telecommunications equipment.

The present invention further provides a process for producing electrochemical cells of the present invention. Electrochemical cells of the present invention are obtainable for example by a cathode (A) and an anode (B) being combined with each other in a receptacle and admixed with electrolyte (C). Housings for example are useful as receptacle. It will be appreciated that at the same time as or after the combining of cathode (A) and anode (B) an operation may be carried out for combining with other battery constituents, for example with one or more separators or one or more current collector platelets.

The admixing with electrolyte (C) is performable for example by filling initially or subsequently. In one preferred version, the admixing with electrolyte is preceded by the internal pressure of the cell in question being lowered to values below 25 000 Pa (pascal).

The invention is elucidated by working examples.
The electrodes used were as follows in all cases:
Cathode (A.1): a lithium-nickel-manganese-spinel electrode was used, it was prepared as follows. The following were mixed together:
85% of $LiMn_{1.5}Ni_{0.5}O_4$
6% of PVdF, commercially available as Kynar Flex® 2801 from Arkema Group,
6% of carbon black, BET surface area 62 $m^2/g$, commercially available as "Super P Li" from Timcal,
3% of graphite, commercially available as KS6 from Timcal;
in a screw-top vessel. Sufficient N-methylpyrrolidone (NMP) was added under agitation to obtain a viscid paste without lumps. Stirring was done for 16 hours.

The paste thus obtained was then blade coated onto aluminum foil 20 μm in thickness and dried in a vacuum drying cabinet at 120° C. for 16 hours. Coating thickness after drying was 30 μm. Circular segments were then die cut out with a diameter of 12 mm.

Anode (B.1): The following were mixed together:
91% of ConocoPhillips C5 graphite
6% of PVdF, commercially available as Kynar Flex®2801 from Arkema Group,
3% of carbon black, BET surface area 62 $m^2/g$, commercially available as "Super P Li" from Timcal,
in a screw-top vessel. Sufficient NMP was added under agitation to obtain a viscid paste without lumps. Stirring was done for 16 hours.

The paste thus obtained was then blade coated onto copper foil 20 μm in thickness and dried in a vacuum drying cabinet at 120° C. for 16 hours. Coating thickness after drying was 35 μm. Circular segments were then die cut out with a diameter of 12 mm.

The test cell used had a construction as per FIG. 1. On assembly of the cell, it was assembled in the upward direction of the schematic FIG. 1. FIG. 1 has the anode side at the top and the cathode side at the bottom.

The annotations in FIG. 1 mean:
1, 1' die
2, 2' nut
3, 3' sealing ring—two in each case; the second, somewhat smaller sealing ring in each case is not shown here
4 spiral spring
5 current collector made of steel
6 housing Cathode (A-1) was applied atop the die of cathode side 1'. A separator composed of glass fiber, thickness of separator: 0.5 mm, was then laid atop cathode (A-1). The mixture to be tested was drizzled onto the separator. Anode (B-1) was placed on the drenched separators. Current collector 5 took the form of a stainless steel platelet applied directly to the anode. Then, the seals 3 and 3' were added and the components of the test cell were screwed together. The steel spring configured as spiral spring 4 and the pressure produced by the threaded union with anode die 1 ensured electrical contact.

II.1 Producing an Inventive Electrochemical Cell EZ.1 and Testing

Whatman (GF/D) was used as separator and drizzled for this purpose with electrolyte in an argon-filled glove box and positioned between a cathode (A-1) and an anode (B-1), so that both the anode and the cathode were in direct contact with the separator. Electrolyte E-1 was added to obtain inventive electrochemical cell EZ.1.

The test mixture used as E-1 ("electrolyte") was:
1 M $LiPF_6$, dissolved in ethylene carbonate and ethyl methyl carbonate in a mass ratio of 1:1, and 2 wt % of compound (IIa. 1), based on sum total of $LiPF_6$, ethylene carbonate and ethyl methyl carbonate.

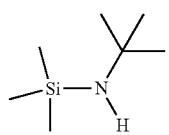

II a.1

For this a mixture of ethylene carbonate and ethyl methyl carbonate (1:1, see above) was dried over molecular sieves. Then, compound (IIa. 1) was dissolved in the mixture. This was followed by further drying over molecular sieves and the addition of $LiPF_6$ to obtain electrolyte E-1 ("electrolyte").

E-1 comprised 10 ppm of water, determined by Karl Fischer titration to DIN 51777 or ISO760: 1978 with coulometric detection.

The test was repeated but with an electrolyte solution comprising no (IIa. 1) to obtain electrochemical comparative cell V-EZ.2.

II. Electrochemical Characterization of Cell:
The electrochemical investigations on EZ.1 and V-EZ.2 were carried out between 4.25 V and 4.8 V.

The first two cycles were run at 0.2 C rate for forming; cycles No. 3 to No. 50 were cycled at 1 C rate, followed again by 2 cycles at 0.2 C rate, followed by 48 cycles at 1 C rate, etc. The cell was charged/discharged using an MACCOR Battery Tester at room temperature.

It was possible to show that battery capacity remained very stable throughout repeated charging and discharging.

The results are depicted in FIG. 2.

We claim:

1. A lithium ion battery comprising
   (A) at least one cathode comprising at least one lithiated Mn-containing compound having an Mn content of from 60 to 80 mol %, based on transition metal in cathode (A),
   (B) at least one anode comprising carbon in electrically conductive form,
   (C) at least one electrolyte comprising
      at least one aprotic organic solvent (a),
      at least one lithium salt (b), and
      at least one organic compound (c) having at least one Si—N single bond per molecule, wherein said organic compound (c) comprises a compound of general formula (III) or (IV):

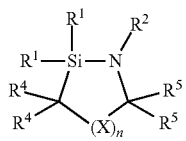
(III)

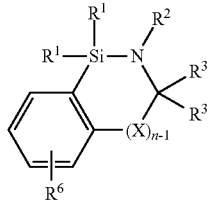
(IV)

wherein
   $R^1$ in each occurrence is the same or different and selected from the group consisting of $C_1$-$C_{10}$-alkyl, $C_1$-$C_{10}$-alkoxy, $C_3$-$C_{10}$-cycloalkyl, benzyl and $C_6$-$C_{14}$-aryl, each unsubstituted or substituted one or more times with $C_1$-$C_4$-alkyl, benzyl or phenyl,
   $R^2$ is selected from the group consisting of $COOR^7$, $C_1$-$C_{10}$-alkyl, $C_2$-$C_{10}$-alkenyl, $C_3$-$C_{10}$-cycloalkyl, benzyl, and $C_6$-$C_{14}$-aryl, each unsubstituted or substituted one or more times with $C_1$-$C_4$-alkyl, benzyl or phenyl,
   $R^3$ is selected from the group consisting of hydrogen, $C_1$-$C_{10}$-alkyl, $C_3$-$C_{10}$-cycloalkyl, benzyl, and $C_6$-$C_{14}$-aryl, each unsubstituted or substituted one or more times with $C_1$-$C_4$-alkyl, benzyl or phenyl, when compound (c) comprises a compound of formula (III) or (IV);
   wherein $R^2$ and $R^3$ may be the same or different,
   $R^4$ and $R^5$ are the same or different and are each selected from the group consisting of hydrogen, $C_1$-$C_{10}$-alkyl, $C_3$-$C_{10}$-cycloalkyl, benzyl and $C_6$-$C_{14}$-aryl, each unsubstituted or substituted one or more times with $C_1$-$C_4$-alkyl, benzyl or phenyl,
   or $>C(R^4)_2$ is a $>C=O$ group,
   X if present at all or in multiple occurrence, is the same or different and selected from the group consisting of oxygen, sulfur, N—$R^6$ and $C(R^4)_2$, where
   $R^6$ is selected from the group consisting of $C_1$-$C_{10}$-alkyl, $C_3$-$C_{10}$-cycloalkyl, benzyl and $C_6$-$C_{14}$-aryl, each unsubstituted or substituted one or more times with $C_1$-$C_4$-alkyl, benzyl or phenyl, $R^7$ in each occurrence is the same or different and selected from the group consisting of hydrogen, $C_1$-$C_{10}$-alkyl, $C_3$-$C_{10}$-cycloalkyl, benzyl and $C_6$-$C_{14}$-aryl, each unsubstituted or substituted one or more times with $C_1$-$C_4$-alkyl, benzyl or phenyl, and
   n is an integer from 1 to 3.

2. The lithium ion battery according to claim 1, wherein said lithiated Mn-containing compound is a lithiated Mn-containing spinel.

3. The lithium ion battery according to claim 1, wherein said lithiated Mn-containing compound is a compound of the general formula (I):

$$Li_{1+t}M_{2-t}O_{4-d} \quad (I),$$

where
   d is from zero to 0.4,
   t is from zero to 0.4, and
   M is two or more metals from groups 3 to 12 of the periodic table, wherein more than 60 mol % of M is manganese.

4. The lithium ion battery according to claim 1, wherein said anode (B) comprises graphite.

5. The lithium ion battery according to claim 1, wherein said aprotic organic solvent (a) is selected from the group consisting of organic carbonates (cyclic or acyclic), di-$C_1$-$C_{10}$-alkyl ethers, di-$C_1$-$C_4$-alkyl-$C_2$-$C_6$-alkylene ethers, and cyclic and acyclic acetals and ketals.

6. The lithium ion battery according to claim 1 that comprises Compound III a, III b, IV a or IV b:

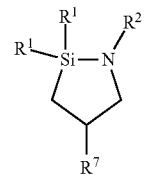
(III a)

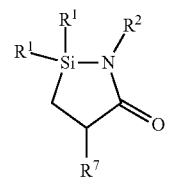
(III b)

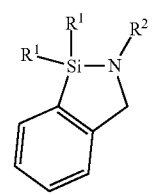
(IV a)

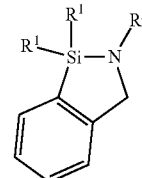
(IV b)

$R^1$ in each occurrence is the same and selected from the group consisting of $C_1$-$C_4$-alkyl, $C_1$-$C_4$-alkoxy and phenyl,
$R^2$ is selected from the group consisting of $C_1$-$C_4$-alkyl, $COOCH_3$, $COOC_2H_5$, $C_2$-$C_3$-alkenyl and phenyl, $R^7$ is selected from the group consisting of hydrogen and methyl.

7. The lithium ion battery of claim 1, wherein a potential difference of at least 4.5 volt is reached between at least one anode and at least one cathode at least temporarily during the production and/or use of the electrochemical cell in question.

8. A motor vehicle comprising the lithium ion battery of claim 1.

9. Telecommunications equipment comprising the lithium ion battery of claim 1.

10. A process for producing the lithium ion battery according to claim 1, which comprises a cathode (A) and an anode (B) being combined with each other in a receptacle and admixed with electrolyte (C).

11. The process according to claim 10, wherein the admixing with electrolyte is preceded by the internal pressure of the cell in question being lowered to values below 25,000 Pa (pascal).

12. A lithium ion battery comprising:
(A) at least one cathode comprising at least one lithiated Mn-containing compound having an Mn content of from 60 to 80 mol %, based on transition metal in cathode (A),
(B) at least one anode comprising carbon in electrically conductive form,
(C) at least one electrolyte comprising (i) at least one aprotic organic solvent, (ii) at least one lithium salt, and (iii) at least one organic compound having at least one Si—N single bond per molecule; wherein the Si—N single bond is part of a ring.

13. The lithium ion battery of claim 1, wherein the at least one organic compound (c) comprises a compound of formula (III).

14. The lithium ion battery of claim 1, wherein the at least one organic compound (c) comprises a compound of formula (IV).

* * * * *